United States Patent [19]
Gungl et al.

[11] Patent Number: 5,241,139
[45] Date of Patent: Aug. 31, 1993

[54] METHOD AND APPARATUS FOR DETERMINING THE POSITION OF A MEMBER CONTACTING A TOUCH SCREEN

[75] Inventors: Klaus P. Gungl, Boeblingen, Fed. Rep. of Germany; James L. Levine, Yorktown Heights, N.Y.

[73] Assignee: International Business Machines Corporation, Armonk, N.Y.

[21] Appl. No.: 858,180

[22] Filed: Mar. 25, 1992

[51] Int. Cl.$^5$ .......................................... G08C 21/00
[52] U.S. Cl. ................................................... 178/18
[58] Field of Search .................................... 178/18, 19

[56] References Cited

U.S. PATENT DOCUMENTS

| | | | |
|---|---|---|---|
| 4,511,760 | 4/1985 | Garwin et al. | 178/18 |
| 4,558,313 | 12/1985 | Garwin et al. | 340/709 |
| 4,623,757 | 11/1986 | Marino | 178/18 |
| 4,672,558 | 6/1987 | Beckes et al. | 364/518 |
| 4,675,569 | 6/1987 | Bowman et al. | 310/328 |
| 4,703,316 | 10/1987 | Sherbeck | 340/706 |
| 4,745,565 | 5/1988 | Garwin et al. | 364/571 |
| 4,963,702 | 10/1990 | Yaniger et al. | 178/18 |

FOREIGN PATENT DOCUMENTS

| | | |
|---|---|---|
| 63-172325 | 7/1988 | Japan . |
| 64-58012 | 3/1989 | Japan . |
| 1-125615 | 5/1989 | Japan . |
| 2-153420 | 6/1990 | Japan . |

OTHER PUBLICATIONS

Reed, M. A., "Self-Calibration and Coordinate Conversion for a Touchpad or Touch Screen Computer Input Device", *IBM Tech. Disc. Bull.*, vol. 30, #4, Sep. 1987, pp. 1663-1666.

Reed, M. A., "Device Driver for a Touchpad or Touch Screen Computer Input Device", *IBM Tech. Disc. Bull.*, vol. 30, No. 4, Sep. 1987, pp. 1674-1676.

*Primary Examiner*—Stafford Schreyer
*Attorney, Agent, or Firm*—Heslin & Rothenberg

[57] ABSTRACT

A method and apparatus for determining a position of a member contacting a touch screen includes determining initial coordinates of the member at a first time, determining subsequent coordinates of the member at a subsequent time, and defining possible coordinates of the member to be between the initial coordinates and subsequent coordinates, then redetermining subsequent coordinates of the member at a further subsequent time, and redefining possible coordinates of the member to be between redetermined subsequent coordinates and previously defined possible coordinates. Redetermining subsequent coordinates and redefining possible coordinates may be repeated until subsequent coordinates and redefined coordinates are within a predetermined distance for a predetermined number of repetitions. The method and apparatus may be reinitialized if subsequent coordinates are beyond a specified distance of previously determined possible coordinates.

40 Claims, 1 Drawing Sheet

METHOD AND APPARATUS FOR DETERMINING THE POSITION OF A MEMBER CONTACTING A TOUCH SCREEN

TECHNICAL FIELD

This invention relates to the touch screen technology field. More particularly, the invention relates to a method and apparatus for determining the position of a member contacting a touch screen.

DESCRIPTION OF THE PRIOR ART

Touch screen devices provide the user of a computer with a direct way of interacting with the computer. The touch screen is contacted to request a specified function. In these types of devices, a transparent surface used as the touch screen is positioned over the cathode ray tube ("CRT") and sensors are attached to the transparent plate which generate signals representative of the position of the touch screen which has been contacted by the member. The member can typically be the finger of the user or some other member or device such as a stylus or the like. Areas of the touch screen which indicate a particular area to be touched for selection of a portion of a menu are typically referred to as "soft keys" which are displayed upon the CRT. The user of the system indicates which selection of the menu is to be chosen by contacting the specific area of the touch screen. The sensors attached to the touch screen and generate a signal which is processed by a microprocessor to determine the X-Y coordinates of the screen which have been contacted by the member. In this manner, the processor then decides which particular menu option has been chosen based upon the resultant X-Y coordinates calculated.

Various touch screen devices have been developed which operate using the aforementioned technology. For example, Perronneau et al. in U.S. Pat. No. 3,657,475 teach a position indicating system in which a rigid plate is fixed to a display surface by at least three spaced apart sensors. The outputs of the sensors are processed to determine the position of the contacting member. The sensors may be piezoelectric elements which produce a voltage output which is proportional to the magnitude of the applied force on the touch screen. One problem with this particular system is the inherent inaccuracy in measuring the forces because of the way the sensors are connected to the touch screen and CRT.

Other systems have been developed to attempt to increase the system's accuracy for determining the exact coordinates of the member contacting the touch screen. For example, U.S. Pat. No. 4,121,049 to Roeber teaches the use of leaf springs arranged along four sides of the touch screen which contains strain gauges which generate an output indicative of the force produced on these springs. DeCosta et al. in U.S. Pat. Nos. 4,340,777 and 4,355,202 attempt to minimize inaccuracies by providing pointed members which are attached to the touch screen in order to minimize the contact surface area between the sensors and the touch screen to provide more accurate force readings from the sensors. Bowman et al. in U.S. Pat. No. 4,675,569 provide another system for minimizing the inaccuracies of touch screen technology by utilizing a touch screen assembly where a glass plate touch screen is seated on a gasket located on the frame of a CRT assembly. The touch screen has a plurality of piezoelectric elements which are bonded thereto between the CRT face and glass plate to help prevent movement of the touch screen in the X-Y coordinates.

Although the aforementioned systems improve the accuracy of calculating the contacted X-Y coordinates of the touch screen, these systems do not account for inaccuracies due to inconsistencies of the positioning of the member by the user of the system. For example, inaccuracies may result if the force applied through the member on the touch screen is not directly perpendicular to the touch screen and/or if the member shifts slightly while contacting the touch screen. Moreover, if the coordinates are calculated shortly after initial contact with the touch screen transient effects may result in inaccurate computation of the actual X-Y coordinates of the touch screen being contacted by the member.

One technique for minimizing user error is disclosed in Garwin et al., U.S. Pat. No. 4,511,760. Using this technique, the processor determines the peak force sensed by the piezoelectric sensors and the peak force is detected when the user releases the member from contact with the touch screen. Although this system may help minimize the calculation of inaccurate X-Y coordinates, the calculation of the X-Y coordinates is dependent upon the position of maximum force applied by the member. The position of the maximum force, however, is not necessarily the actual position of the member.

It is therefore desirable to provide a method and apparatus which more accurately detects the actual coordinates of the touch screen contacted by a member.

It is also desirable to achieve greater accuracy by minimizing the effect of user error in positioning the member at the appropriate section of the touch screen.

It is further desirable to provide a touch screen system which is capable of determining the position of a member contacting a touch screen if the position of the member contacting the touch screen has been moved from a first position to a second position without the system calculating the position of the coordinates of the first position.

DISCLOSURE OF THE INVENTION

The aforementioned objects and advantages may be achieved through implementation of the method and apparatus for determining the position of a member contacting a touch screen in accordance with the principles of the present invention.

The method includes determining initial coordinates of the member at a first time, determining subsequent coordinates of the member at a second time, and defining possible coordinates of the member to be between the initial coordinates and the subsequent coordinates. The method further includes redetermining subsequent coordinates at a further subsequent time, and redefining possible coordinates of the member to be between redetermined subsequent coordinates and previously defined possible coordinates. The method may also include repeatedly redetermining subsequent coordinates of the member at a further subsequent time and repeatedly redefining possible coordinates of the member to be between redetermined subsequent coordinates and previously defined possible coordinates until subsequent coordinates and redefined possible coordinates are within a predetermined distance for a predetermined number of repetitions.

The initial coordinates may be redetermined if the subsequent coordinates are more than a predetermined distance apart from the initial coordinates, or if the subsequent coordinates are more than a predetermined distance apart from the possible coordinates. The possible coordinates may be half way in between the subsequent coordinates and initial coordinates. Moreover, the possible coordinates may be half way in between the redetermined subsequent coordinates and previously defined possible coordinates.

The method in accordance with the principles of the present invention may be described as determining initial coordinates of the member at a first time, determining subsequent coordinates of the member at a subsequent time, determining the distance from the initial coordinates to the subsequent coordinates, and defining a particular distance between the initial coordinates and the subsequent coordinates. The particular distance between the initial coordinates and the subsequent coordinates defines possible coordinates of the member. This method may also include redetermining subsequent coordinates of the member at a further subsequent time, and defining a particular distance between the redetermined subsequent coordinates and the possible coordinates of the member. These steps may be repeated until subsequent coordinates and possible coordinates are within a predetermined distance for a predetermined number of repetitions of these steps.

The invention also includes an apparatus for determining a position of a member contacting a touch screen which includes a means for determining initial coordinates of the member at a first time, means for determining subsequent coordinates of the member at a subsequent time, and means for defining possible coordinates of the member to be between the initial coordinates and the subsequent coordinates. The means may also include a means for redetermining subsequent coordinates of the member at a subsequent time, and means for redefining possible coordinates of the member to be between the redetermined subsequent coordinates and previously defined possible coordinates. The apparatus may also include a means for repetitively redetermining subsequent coordinates of the member and for repetitively redefining possible coordinates of the member to be between redetermined subsequent coordinates and previously defined possible coordinates.

The apparatus may also be described as including a means for determining initial coordinates of the member at a first time, means for determining one or more subsequent coordinates of the member at a subsequent time wherein initial coordinates and subsequent coordinates define a stream of coordinates, and the means for defining possible coordinates representative of a stable position of the member based upon the stream of coordinates.

BRIEF DESCRIPTION OF THE DRAWINGS

The invention will now be described with reference to the drawings in which.

BEST MODE FOR CARRYING OUT THE INVENTION

Figure 1:
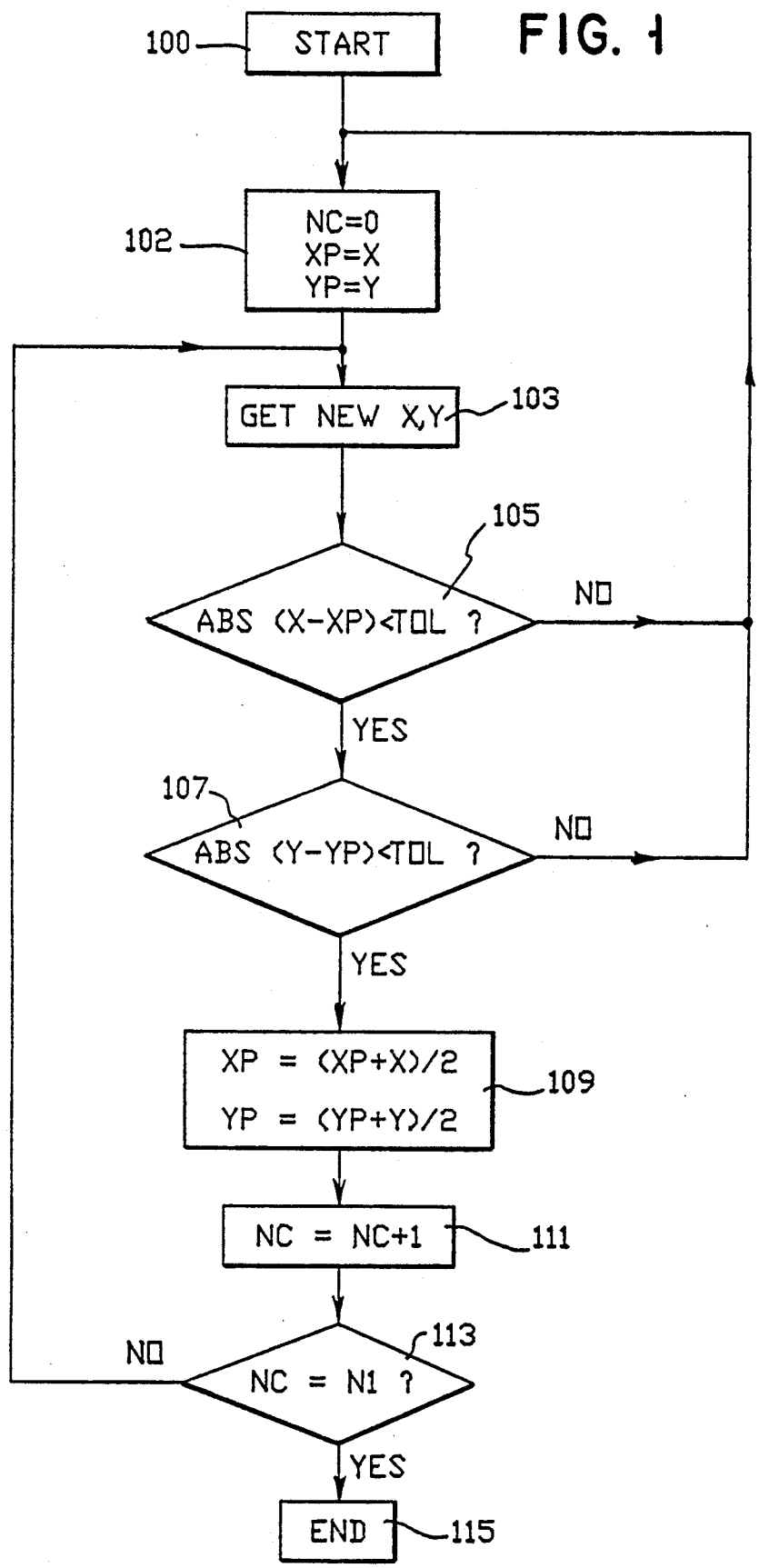
FIG. 1 depicts a flow diagram representative of the method for determining a position of a member contacting a touch screen in accordance with the principles of the present invention.

The system for determining the position of a member contacting a touch screen in accordance with the principles of the present invention may be utilized in any conventional touch screen technology including force sensing, infrared, surface-acoustic wave, and analog-electric touch screen technologies as are well known in the art. However, the invention will now be described in conjunction with conventional force-sensing touch screen technology.

As is well known in the art, force sensing touch screen technologies determine the coordinates of a member contacting the touch screen by use of a microprocessor which converts signals representative of forces on the screen. The processes performed by the processor are based upon the fact that the sum of the forces on the touch screen must equal zero, and that the sum of the moments around the X and Y axes must also equal zero. The mathematical formulas utilized by a microprocessor to calculate the X and Y coordinates of the touch screen which are being contacted are set forth in U.S. Pat. No. 4,745,565 to Garwin et al. dated May 17, 1988 and U.S. Pat. No. 4,511,760 also to Garwin et al. issued Apr. 16, 1985. Each of these patents are hereby incorporated by reference and made a part of the disclosure herein. Accordingly, reference herein to determining X and Y coordinates may therefore be understood as meaning computation or calculation of the X-Y coordinates by any well known technique including, but not limited to, those described in U.S. Pat. Nos. 4,745,565 and 4,511,760.

In accordance with the principles of the present invention, the position of a member which contacts the touch screen may be more accurately determine by the microprocessor performing certain repetitive functions. The microprocessor may be programmed to determine the first initial coordinates of the member which is detected to have contacted the touch screen at an initial time. The system will then track the X-Y coordinates in real time, thereby compiling a stream of coordinates until the stream of coordinates settle on a reasonably stable value. This may be accomplished by comparing the determined positions (X-Y coordinates) of the member periodically and then comparing these positions in order to accurately determine a stable position of the member along the coordinates of the touch screen. The stable position may be defined as any calculated position of the member computed based upon the determined coordinates of the member.

Referring to the flow diagram of FIG. 1, the technique for determining the position of a member contacting a touch screen will be described. Reference to coordinates refer to the "X" and "Y" coordinates of a touch screen using the techniques well known in the art. The position of the member at a particular point in time is calculated by the microprocessor of the particular touch screen system as is also well known in the art. Various parameters depicted in the flow diagram will now be described. "NC" represents a counter which counts the number of repetitions where a new coordinate reading for the member contacting the screen is determined to be close to a stable location whose approximate coordinates "XP" and "YP" are refined during the repetitions of the algorithm. "N1" represents the number of repetitions, counted by "NC", necessary for the microprocessor to establish that the coordinates have stabilized. "TOL" represents the maximum distance in both the X and Y directions between the coordinates of contact at a current time, and the possible stable location, for which the calculation will be continued. If the distance is greater than "TOL", then the calculation will be restarted with "NC" reset to zero. This last step reduces the detection time in case a large motion occurred prior to the stable position being reached.

The process involves initially determining coordinates of the member contacting the screen and subsequently determining the coordinates of the member and comparing the initial and subsequent coordinates to arrive at the most likely or the possible coordinates of the member. The process continues to subsequently determine the coordinates of the member and compares previously determined coordinates with subsequently defined possible coordinates to define new possible coordinates for the member contacting the screen. In real time, the system compares the currently determined coordinates with previously defined possible coordinates to define new possible coordinates. After a specified number of repetitions where the subsequent coordinates are within a specified distance from the current possible coordinates, the microprocessor will define a final set of coordinates representing the location of the member contacting the touch screen in the X-Y coordinate system.

In accordance with the flow diagram of FIG. 1, the program is started at the initial step 100. In the next step 102, the counter NC is initialized to zero and the microprocessor determines the initial coordinates of the member contacting the screen. The initial coordinates are represented by XP, YP. In the following step 103, the microprocessor determines subsequent coordinates of the member contacting the touch screen. The subsequent coordinates are represented by X, Y. In the following step 105 the distance between X values of the initial coordinates and the subsequent coordinates are compared. If the absolute value of this distance is below a specified predetermined distance "TOL", then the process evolves to the next step 107. In the next step 107, the distance between the Y coordinates of the initial coordinates and the subsequent coordinates are determined. If the absolute value of the Y coordinates is also below a specified predetermined distance "TOL" then the process evolves to the next step 109.

If the distance between the respective X or Y coordinates is greater than "TOL", then the process will revert back to step 102 and become reinitialized. In this situation, new initial coordinates will be determined and the process will be restarted. This feature enables the process to be reinitialized if the member contacting the touch screen is moved greater than a predetermined distance. For example, if the member contacting the touch screen is placed at an initial position on the touch screen in error, and then subsequently moved to the correct position, the process will be reinitialized and the previously determined possible coordinates and initial coordinates will not be used as a basis for defining a stable position of the member.

In the next step 109, the possible coordinates (which represent calculated coordinates based upon the initial and subsequent coordinates) are defined as a preselected distance between the X coordinates of the initial coordinate and subsequent coordinate as well as a preselected distance between the Y coordinates of the subsequent coordinates and initial coordinates. Preferably, the distance between these possible coordinates is defined as the midpoint between both the X and Y coordinates. Accordingly, the possible coordinates will be defined by the microprocessor as a point midway between the subsequent coordinate (previously determined by the microprocessor) and the initial coordinates (initially determined by the microprocessor). However, the definition of the possible coordinates is not limited to the midway point. Any position relative to the initial and subsequent coordinates may be used.

After the possible coordinates have been defined, the counter is incremented in the next step 111. In the next step 113, if the counter is below a predetermined value "N1" then the process will revert to the coordinate determining step 103. In this step 103, the microprocessor will again redetermine subsequent coordinates of the member contacting the screen. In the next steps 105, 107 the processor will compare the X and Y coordinates of the redetermined subsequent coordinates and the previously defined possible coordinates, i.e., "XP", "YP". Again, if these values are below a predetermined distance, i.e., "TOL", then new current possible coordinates will be defined in step 109. Again the new current possible coordinates is preferably defined as the midway point between the subsequent coordinates and the previously determined possible coordinates. However, the current possible coordinates may be defined as any coordinate which is based upon the location of the previously defined subsequent coordinates, the initial coordinates and/or the possible coordinates. In the next step 111, the counter will be incremented. If in the next step 113, the counter is below a predetermined value, i.e., N1 then the process will again revert back to step 103.

In steps 105 and 107, the distance between the X and Y coordinates, respectively, of the redetermined subsequent coordinates and previously defined possible coordinates are calculated by using the absolute value of the distance between the respective X and Y coordinates. It is possible, however, to calculate the distance in steps 105 and 107 between the X and Y coordinates of redetermined subsequent coordinates and previously defined possible coordinates, as well as between initial coordinates and subsequent coordinates, to be equal to the square root of the sum of the squares of the distances between the coordinates measured. For example, in lieu of determining the absolute value between the respective X coordinates and Y coordinates separately as in steps 105 and 107, a substitute step which measures the distance between the X coordinate direction may be squared and added to the square of the distance between the Y coordinates in the Y coordinate direction. The square root of the resultant figure will then represent the distance between the subsequent coordinates and previously determined possible coordinates, or the initial coordinates and subsequent coordinates. This may be referred to as the sum of the squares method of calculating distance between two points. If this distance is greater than a predetermined distance, which may also be referred to as "TOL", then the process will revert back to step 102. This procedure for determining the distance is not presently the preferred procedure, as it is rather computation intensive and, therefore, requires more complex programming and more time for the program to run..

If at any time during steps 105 or 107 the distance between the X and Y coordinates for possible coordinates and subsequent coordinates are greater than or equal to the predetermined distance, i.e., "TOL" then the process will revert to the initial determining step 102 and the microprocessor will calculate new initial X-Y coordinates and initialize the counter such that "NC" equals zero. If this occurs, the microprocessor will effectively determine that the subsequent coordinate is too great a distance from the previously determined possible coordinates as is the case when the member contacting the screen has moved to a new location on the screen. The program will end when the counter reaches a predetermined value representative of the fact that the possible coordinates have been within a specified distance from the subsequent coordinates for a predetermined number of counts. When this condition is met, the member is considered to be in a stable position which may then be reported.

The method may be performed so that the possible coordinates reported as the final position of the member is a coordinate between the initial coordinates and subsequent coordinates. This may be accomplished by setting "NC"=1 such that, referring to the flow diagram in FIG. 1, the process will end after step 113 and there will be no repetition of steps 103 and subsequent steps thereafter. In this situation, a stable position of the member is defined to be between the initial coordinates and subsequent coordinates.

The process described in FIG. 1 determines current possible coordinates as midway between previously defined current possible coordinates and subsequent coordinates. It will be apparent to one skilled in the art that other particular relationships other than direct averaging, such as weighted averaging and other data filtering techniques and technology may be implemented using the principles of the present invention.

It will also be understood that the present invention may be applied to determine the position of contact with a one dimensional touch strip. It is only necessary, for example, to leave out step 107 and to proceed directly from step 105 to step 109 of FIG. 1.

While the invention has been described with references to the embodiments thereof, it will be understood by those skilled in the art that various modifications may be made without departing, in any way, from the spirit and scope of the invention as defined in the following claims.

What is claimed is:

1. A method for determining the position of a member contacting a touch screen comprising the steps of:
   (a) determining at least one initial coordinate of the member at a first time;
   (b) determining at least one subsequent coordinate of the member at a subsequent time;
   (c) defining at least one possible coordinate of the member to be between the at least one initial coordinate and the at least one subsequent coordinate.

2. The method of claim 1 further comprising the step of reporting said at least one possible coordinate as the position of the member.

3. The method of claim 1 further comprising the steps of:
   (d) redetermining at least one subsequent coordinate of the member at a further subsequent time;
   (e) redefining at least one possible coordinate of the member to be between the redetermined at least one subsequent coordinate of step (d) and the previously defined at least one possible coordinate of step (c).

4. The method of claim 3 further comprising the step of reporting said at least one possible coordinate as the position of the member.

5. A method for determining the position of a member contacting a touch screen comprising the steps of:
   (a) determining initial coordinates of the member at a first time;
   (b) determining subsequent coordinates of the member at a subsequent time;
   (c) defining possible coordinates of the member to be between the initial coordinates and the subsequent coordinates;
   (d) redetermining subsequent coordinates of the member at a further subsequent time;
   (e) redefining possible coordinates of the member to be between the determined subsequent coordinates of step (d) and the previously defined possible coordinates of step (c).

6. The method of claim 5 further comprising the step of repeating step (a) if the initial coordinates and subsequent coordinates are more than a predetermined distance apart.

7. The method of claim 5 further comprising the steps of:
   repeating steps (d) and (e) until subsequent coordinates and redefined possible coordinates are within a predetermined distance for a predetermined number of repetitions of steps (d) and (e).

8. The method of claim 7 further comprising the step of repeating step (a) if the possible coordinates and subsequent coordinates are more than a predetermined distance apart.

9. The method of claim 5 wherein step (c) comprises defining the possible coordinates to be half way in between the subsequent coordinates and the initial coordinates.

10. The method of claim 9 wherein step (e) comprises redefining the possible coordinates of the member to be half way in between the redetermined subsequent coordinates of step (d) and the previously defined possible coordinates.

11. An apparatus for determining a position of a member contacting a touch screen comprising:
   (a) means for determining at least one initial coordinate of the member at a first time;
   (b) means for determining at least one subsequent coordinate of the member at a subsequent time; and
   (c) means for defining at least one possible coordinate of the member to be between the at least one initial coordinate and the at least one subsequent coordinate.

12. The apparatus of claim 11 further comprising means for reporting said at least one possible coordinate as the position of the member.

13. The apparatus of claim 11 further comprising:
   (d) means for redetermining at least one subsequent coordinate of the member at a further subsequent time; and
   (e) means for redefining at least one possible coordinate of the member to be between the redetermined at least one subsequent coordinate and the at least one previously defined possible coordinate.

14. The apparatus of claim 13 further comprising means for reporting said at least one possible coordinate as the position of the member.

15. The apparatus of claim 13 further comprising:
   means for causing means (d) and (e) to repetitively redetermine and redefine at least one possible coordinate of the member to be between at least one redetermined subsequent coordinate and at least one previously defined possible coordinate.

16. The apparatus of claim 15 further comprising means for redetermining at least one initial coordinate to equal at least one subsequent coordinate if the at least one initial coordinate and at least one previously defined possible coordinate are more than a predetermined distance apart.

17. The apparatus of claim 11 further comprising means for defining the at least one possible coordinate to be halfway in between the at least one subsequent coordinate and the at least one initial coordinate.

18. The apparatus of claim 17 further comprising means for redefining the at least one possible coordinate of the member to be halfway in between the at least one redetermined subsequent coordinate and the at lease one previously defined possible coordinate.

19. A method for determining the position of a member contacting a touch screen comprising:
   (a) determining initial coordinates of a member at a first time;
   (b) determining subsequent coordinates of the member at a subsequent time;
   (c) determining the distance from the initial coordinates to the subsequent coordinates; and
   (d) defining possible coordinates of said member to be at a position between the initial coordinates and the subsequent coordinates if said initial coordinates and said subsequent coordinates are less than a predetermined distance apart.

20. The method of claim 19 further comprising the step of:
   (e) redetermining the initial coordinates of the member at a further subsequent time if the possible coordinates and the initial coordinates are more than a predetermined distance apart.

21. The method of claim 20 further comprising repeating steps (d) and (e) until subsequent coordinates and possible coordinates are within a predetermined distance for a predetermined number of repetitions of steps (d) and (e).

22. The method of claim 21 further comprising repeating steps (a), (b), and (c) if the possible coordinates and subsequent coordinates are more than a predetermined distance apart.

23. The method of claim 19 wherein step (c) comprises determining the absolute distance between the initial coordinates and the subsequent coordinates.

24. The method of claim 19 wherein step (c) further comprises determining said absolute distance along a first coordinate axis, and determining said absolute distance along a second coordinate axis, said first axis being perpendicular to said second axis.

25. A method for determining the position of a member contacting a touch screen comprising the steps of:
   (a) determining initial coordinates of the member at a first time;
   (b) determining subsequent coordinates of the member at one or more subsequent time intervals, said initial coordinates and subsequent coordinates comprising a stream of coordinates representative of positions of the member contacting the touch screen;
   (c) defining a stable position of the member based upon the stream of coordinates;
   (d) reporting the stable position of the member.

26. The method of claim 25 wherein defining the stable position of the member comprises averaging the stream of coordinates.

27. The method of claim 26 wherein defining a stable position of the member comprises averaging the stream of coordinates by the steps of:
   (e) calculating a first set of possible coordinates between the initial coordinates and a first set of subsequent coordinates determined at a first time interval;
   (f) calculating a second set of possible coordinates between a second set of subsequent coordinates determined at a second time interval and the first set of possible coordinates;
   (g) repeating steps (e) and (f) until the possible coordinates are within a predetermined distance for a predetermined number of repetitions of steps (e) and (f) wherein a final set of possible coordinates defines the stable position.

28. The method of claim 26 further comprising repeating steps (a), (b), (c) and (d) when a set of coordinates within the stream of coordinates is greater than a predetermined distance from said stable position.

29. The method of claim 28 wherein defining a stable position of the member comprises averaging the stream of coordinates by the steps of:
   (e) calculating a first set of possible coordinates between the initial coordinates and a first set of subsequent coordinates determined at a first time interval;
   (f) calculating a second set of possible coordinates between a second set of subsequent coordinates determined at a second time interval and the first set of possible coordinates;
   (g) repeating steps (e) and (f) until the possible coordinates are within a predetermined distance for a predetermined number of repetitions of steps (e) and (f) wherein a final set of possible coordinates defines the stable position.

30. The method of claim 29 further comprising repeating steps (e), (f), and (g) when a set of subsequent coordinates is greater than a predetermined distance from a previously calculated set of possible coordinates.

31. An apparatus for determining a position of a member contacting a touch screen comprising:
   (a) means for determining initial coordinates of the member at a first time;
   (b) means for determining subsequent coordinates of the member at a subsequent time;
   (c) means for determining the distance from the initial coordinates to the subsequent coordinates; and
   (d) means for defining possible coordinates of said member to be at a position between the initial coordinates and the subsequent coordinates if said initial coordinates and said subsequent coordinates are less than a predetermined distance apart.

32. The apparatus of claim 31 further comprising:
   (e) means for redetermining subsequent coordinates of the member at further subsequent times; and
   (f) means for defining a particular distance between the redetermined subsequent coordinates and possible coordinates of the member.

33. The apparatus of claim 31 further comprising means for redetermining the initial coordinates of the member at a further subsequent time if the possible coordinates and the initial coordinates are more than a predetermined distance apart.

34. A method for determining the position of a member contacting a touch screen comprising the steps of:
   (a) determining initial coordinates of the member at a first time;
   (b) determining subsequent coordinates of the member at one or more subsequent time intervals, said initial coordinates and subsequent coordinates comprising a stream of coordinates representative of positions of the member contacting the touch screen;

(c) defining coordinates representative of a possible stable position of the member based upon the stream of coordinates;

(d) reporting the stable position of the member.

35. The method of claim 34 wherein defining possible coordinates representative of a stable position of the member comprises averaging selected ones of the stream of coordinates.

36. The method of claim 34 further comprising repeating steps (a), (b), (c) and (d) when a set of coordinates within the stream of coordinates is greater than a predetermined distance from the possible stable set of coordinates.

37. The method of claim 34 wherein defining possible coordinates representative of a stable position of the member comprises recursively averaging the stream of coordinates by the steps of:

(e) calculating a first set of possible coordinates between the initial coordinates and a first set of subsequent coordinates determined at a first time interval;

(f) calculating a second set of possible coordinates between a second set of subsequent coordinates determined at a second time interval and the first set of possible coordinates;

(g) repeating steps (e) and (f) until the possible coordinates are within a predetermined distance for a predetermined number of repetitions of steps (e) and (f) wherein a final set of possible coordinates defines the stable position.

38. The method of claim 37 further comprising repeating steps (e), (f), (c) and (g) when a set of subsequent coordinates is greater than a predetermined distance from a previously calculated set of possible coordinates.

39. An apparatus for determining a position of a member contacting a touch screen comprising:

(a) means for determining initial coordinates of the member at a first time;

(b) means for determining one or more subsequent coordinates of the member at a subsequent time wherein initial coordinates and subsequent coordinates define a stream of coordinates; and (c) means for defining coordinates representative of a possible stable position of the member based upon the stream of coordinates.

40. The apparatus of claim 39 further comprising means for averaging selected ones of the stream of coordinates.

* * * * *